United States Patent
Finkemeyer et al.

(10) Patent No.: US 6,452,350 B1
(45) Date of Patent: Sep. 17, 2002

(54) LINEAR DRIVE

(75) Inventors: Horst Finkemeyer, Melle; Fried-Helm Herzig, Bad Oeynhausen; Ralf Bokämper, Lübbecke, all of (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/688,469

(22) Filed: Oct. 16, 2000

(30) Foreign Application Priority Data

Oct. 15, 1999 (DE) .................................. 299 18 221 U

(51) Int. Cl.⁷ ............................ H02K 23/68; H02N 2/02
(52) U.S. Cl. ..................... 318/372; 310/317; 310/77; 192/125 A
(58) Field of Search ................... 318/371, 372, 318/614; 310/311, 317, 76, 77, 92, 93, 123; 192/116.5, 125 R, 126, 127, 125 A

(56) References Cited

U.S. PATENT DOCUMENTS 5,377,802 A * 1/1995 Ide .......................... 192/107 C

* cited by examiner

*Primary Examiner*—Bentsu Ro
(74) *Attorney, Agent, or Firm*—Henry M. Feiereisen

(57) ABSTRACT

A linear drive to drive an article of furniture includes at least one drive motor that is coupled with a linearly moveable driven member and a braking system with a controlled braking element which commences the braking function without delay. The braking system can have a small footprint. According to the invention, the drive for the article of furniture can include an actuator, such as a piezo actuator coupled directly or indirectly with the braking element acting on the rotor shaft of the drive motor. The piezo actuator is preferably connected to the electric terminals of the drive motor. The linear drive can be used to adjust the support for a lath bed or a chair.

13 Claims, 1 Drawing Sheet

LINEAR DRIVE

CROSS-REFERENCES TO RELATED APPLICATIONS

This application claims the priority of German Patent Application Serial No. 299 18 221.5, filed Oct. 15, 1999, the subject matter of which is incorporated herein by reference.

BACKGROUND OF THE INVENTION

The present invention relates to a linear drive, in particular to a drive for an article of furniture. The linear drive has at least one drive motor, at least one moveable driven member operatively connected to the drive motor, and a braking element located inside the housing of the drive motor and controlled by an actuating member.

In many applications having a linear drive of this type, for example, drives for adjusting various sections of a bed, the linear drive is designed so that a DC motor drives a spindle via a worm gear. A member in the form of a spindle nut is placed on the spindle for rotation and driven by a motor only in the linear direction. The driven member is connected with the corresponding component to be adjusted through special linkage means in such a way that the linear motion is transferred to the component.

A linear drive of this type cannot be prevented from moving in the reverse direction when the drive motor is turned off. The drive assembly is self-locking, however, only if the force does not exceed a certain value, since the self-locking ability of the drive assembly is mechanically limited. Consequently, the workability of the mechanical design is severely limited.

The drive motor can be a DC motor or an AC motor. If a DC motor is employed, then the motor terminals are commonly short-circuited when the motor is not running. The resulting braking effect is referred to as a generator brake, because the DC motor operates under load as a generator and therefore has to provide a very high current under short-circuit conditions. This increases both the drive torque and the start-up limit under load. However, under frequently adverse operating conditions, so that for a desired minimum actuating speed, the mechanical self-locking effect decreases significantly due to the design of the gear stages.

Several conventional approaches employ additional braking elements so that the drive assembly remains in a rest position even under load. For example, it is known to arrange on a rotor shaft of the motor a limit stop which in conjunction with a moveable stop that can be actuated by an electromagnet, enables the motor to stop when not in operation. With this arrangement, an additional component has disadvantageously to be placed on the drive shaft, which increases the overall size of the housing of the drive motor, while the electromagnet also consumes electric energy. Moreover, a relatively large parts count is required. Only a relatively small drive power is required when articles of furniture are driven by a linear drive. Electromagnetic braking systems conventionally employed in higher power applications, for example heavy machines, where a disc brake system is used to brake the rotor shaft of the motor. The braking force is produced by a spring that takes effect when the motor is standing still. When the motor is running, the force of the spring storage device is offset by an electromagnet. However, this arrangement cannot be easily applied to actuators used with linear drives because of their much greater complexity.

SUMMARY OF THE INVENTION

It is thus an object of the present invention to provide an improved linear drive, obviating the afore-stated drawbacks.

In particular, it is an object of the present invention to provide an improved linear drive of the aforedescribed type so that the braking device does not require a bigger housing, and that the braking device can be engaged without delay or at least without a noticeable delay.

These objects, and others which will become apparent hereinafter, are attained in accordance with the present invention by implementing the actuating member as an actuator, preferably as a piezo actuator, that changes its form in response to an applied electric voltage.

According to one aspect of the invention, an actuator is employed that changes its shape in response to an applied electric voltage. This type of braking device has a very simple design and can be readily implemented with any conventional drive motor. Depending on the application, the braking device can be designed so that it either releases or applies the brake when a voltage is applied to the actuator. If the linear drive is, for example, a drive for an article of furniture, then the braking device is preferably released when a voltage is applied to the actuator. A component connected to the linear drive can then be adjusted without being affected by the brake. As soon as a drive power is switched off, the braking device is activated, so that the component connected to the linear drive remains in the respective position. The drive assembly can be self-locking, so that with the braking device engaged, the component remains in that position even when load is heavier than its own weight. However, a non-self-locking drive assembly may also be employed, in which case the braking device holds the load when the motor is switched off. Since the braking elements of the braking device move only a relatively small distance from the released position into the braking position and vice versa, relatively small actuators may be employed. The necessary braking torque which is a determined by the mechanical load of the drive, is smallest on a rotor shaft of the motor. To reduce the size of the components that produce the braking torque, the actuator is coupled to a braking element that acts on the rotor shaft of the drive motor. To prevent the drive assembly from coasting after the drive motor is switched off, the actuator is connected to the electric terminals of the drive motor. The actuator is thereby activated/deactivated without delay at the same time the drive motor is switched on or off.

According to another aspect of the invention, each actuator is fixedly connected with the braking element of the braking device. The actuator advantageously releases the braking element when an electric voltage is applied. This can be achieved, for example, by changing the shape of the actuator from a circular shape to an oval shape when a voltage is applied. According to yet another aspect of the invention, two opposing braking elements can operate on the rotor shaft of the motor. With this arrangement, the braking force does not transmit a bending torque to the rotor shaft.

According to a first embodiment, an actuator is operatively associated with each braking element. Alternatively, two or more braking elements can be actuated by a single actuator by connecting between the actuator and each braking element a spring-loaded linkage or a lever. In this case, the braking force is generated by the spring(s) when the drive motor is switched off. When the drive motor is switched on, the actuator acts in a direction opposing the spring force. This is particularly advantageous if the linear drive is activated infrequently and only for a relatively short time, as may be the case, for example, with drives used with articles of furniture. Advantageously, the actuator can be integrated with the drive circuit which eliminates the need for additional wiring to supply power to the actuator. This can be accomplished easily by connecting the actuator in parallel with the drive motor. Alternatively, a relay associated with a drive motor controller can be used to control the actuator circuit. Advantageously, two pairs of back-to-back connected diodes and a switch are arranged in this circuit.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
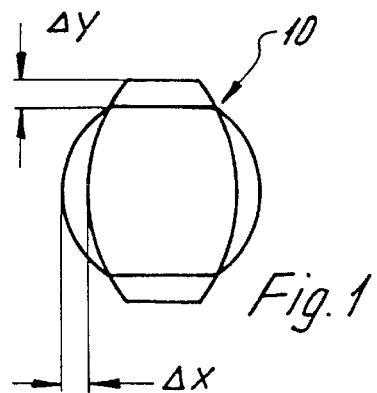
FIG. 1 shows details of an actuator formed as a piezo actuator and assuming two shapes.

Throughout all the Figures, same or corresponding elements are generally indicated by same reference numerals.

Turning now to the drawing, and in particular to FIG. 1, there is shown an exemplary actuator which changes its shape from a round or spherical shape to an oval shape when an electric voltage is applied. The shape can also change in the opposite direction, i.e., from oval to round or spherical, depending on the specific requirements. If the drive is a linear drive for an article of furniture, then an actuator 10 is selected that operates by placing the braking element 11 or the braking elements 11,12 in their respective released position when a voltage is applied to the drive motor (not shown). Delta-x and delta-y designate the dimensions by which the actuator 10 changes in the X-axis and Y-axis, respectively.

Figure 2:
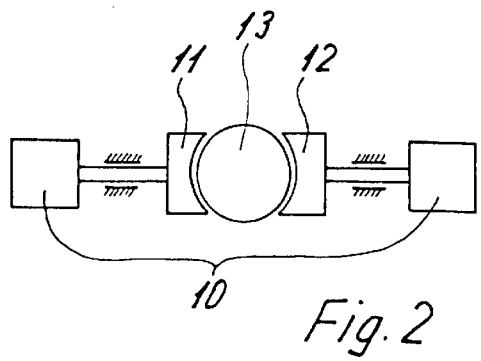
FIG. 2 is a schematic representation of the rotor shaft of a motor that can be a braked by two braking elements.

In the embodiment depicted in FIG. 2, only the rotor shaft 13 of the drive motor is shown. Two opposing braking elements 11, 12 that are fixedly coupled with the two actuators 10, operate on the rotor shaft 13. The coupling operation can be effected, for example, through rods that are movably guided in sliding bearings.

Figure 3:
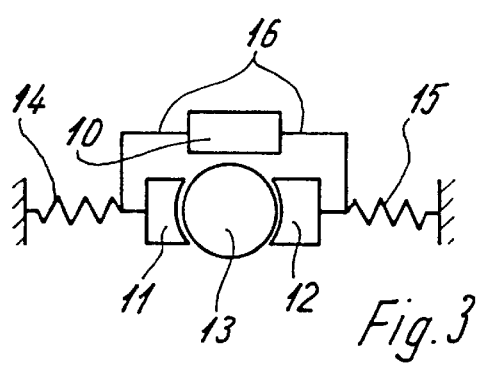
FIGS. 3 and 4 shows two embodiments of the braking elements that are indirectly connected with the actuator.

In the embodiment depicted in FIG. 3, two compressions springs 14, 15 operate directly on the two braking elements 11, 12, with the compressions springs being urged against the motor shaft 13 with a predetermined force when the drive motor is not switched on. When the motor is switched on, the actuator 10 is activated in such a way that the braking elements 11, 12 which are connected with the actuator 10 via a linkage or a stationarily supported angled lever 16, move into the release position against the force produced by the compression springs 14, 15. In this embodiment, only one actuator 10 is required for the two braking elements 11, 12.

Figure 4:
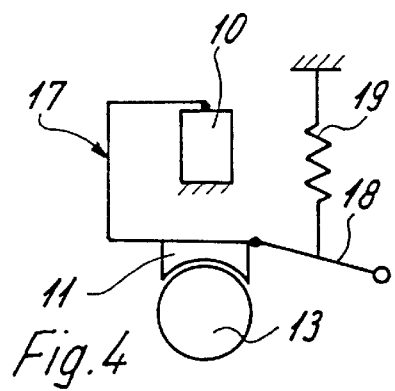

In the embodiment depicted in FIG. 4, the actuator 10 is coupled with a braking element 11 through a U-shaped linkage 17. The linkage 17 is rotatably supported in the region of the braking element 11. Also connected to the linkage 17 is a lever 18 that can be rotated about a stationary axis. A tension spring 19 urges the braking element 11 against the rotor shaft 13 when the motor is not turned on.

As soon as a drive motor is turned on, the actuator 10 is deformed so that the braking element 11 is pulled away from the motor shaft 13 by the linkage 17. Alternatively, the arrangement acting on the motor shaft 13 may also be designed to be mirror-symmetric to the arrangement depicted in FIG. 4.

Figure 5:
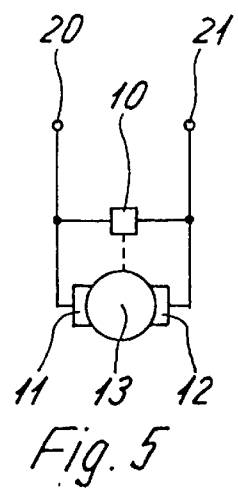
FIG. 5 shows the electrical connection of the actuator with the circuit of the drive motor.

As shown in FIG. 5, the actuator 10 can be integrated in the circuit for the drive motor, and in a most simple manner can be connected in parallel with the motor windings. The two terminals for the drive motor circuit are designated by reference numerals 20 and 21.

Figure 6:
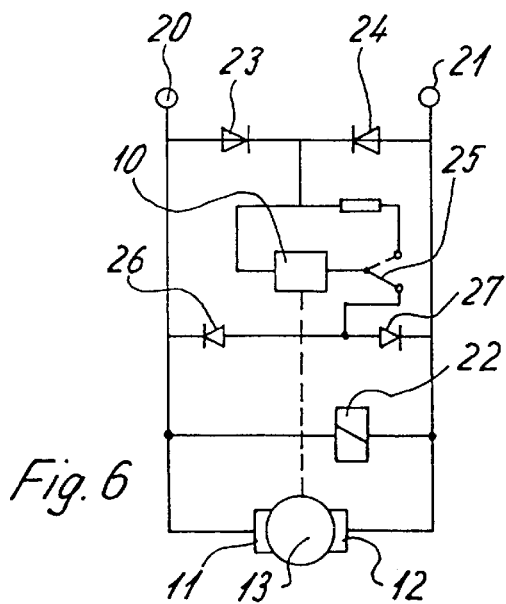
FIG. 6 shows a block circuit diagram wherein the actuator circuit is controlled by a relay associated with a controller of the drive motor.

In another embodiment illustrated in FIG. 6, the actuator is also integrated in the drive motor circuit. As soon as a relay 22 is energized by a voltage applied to terminals 20 and 21, the electric current flows, depending on the polarity of the applied voltage, from one of the terminals 20, 21 through one of two diodes 23, 24, through a relay contact 25 that in the energized state of relay 22 is in the position indicated by the solid line, to finally return through a respective one of diodes 26, 27 to the other one of the terminals 21, 20, thereby activating the actuator 10. As soon as the motor is switched off, releasing the relay 22, the relay contact 25 is placed in the position indicated by the broken line, thereby interrupting the current flow through the actuator 10.

The drive motor can be an AC motor or a DC motor. The motor can be switched through a controller, such as a relay and/or semiconductor or similar electrical or electronic components, in the various directions determining movement or rotation using conventional manual or wireless remote control devices. The invention is not limited to the illustrated embodiments. One or several actuators of various designs can be employed for directly or indirectly operating on the braking element(s) 11, 12 for moving the braking element(s) 11, 12 to either the released or the braking position.

While the invention has been illustrated and described as embodied in a linear drive, it is not intended to be limited to the details shown since various modifications and structural changes may be made without departing in any way from the spirit of the present invention.

What is claimed as new and desired to be protected by Letters Patent is set forth in the appended claims:

1. A linear drive, comprising:
    a housing;
    at least one drive motor disposed in the housing;
    at least one moveable driven member operatively connected to the at least one drive motor;
    at least one braking element arranged inside the housing and capable of braking the motor; and
    at least one actuating member connected to a respective braking element and implemented in the form of an actuator, with the actuator changing a shape in response to an applied electric voltage,
    wherein the at least one drive motor has electric terminals and the at least one actuator is connected to the electric terminals of the at least one drive motor.

2. The linear drive of claim 1, wherein the at least one actuator is one of directly and indirectly coupled with a respective braking element and the at least one braking element operates on the rotor shaft of the at least one drive motor.

3. The linear drive of claim 1, wherein the at least one actuator is fixedly connected with a respective braking element.

4. The linear drive of claim 1, wherein the at least one drive motor has a rotor shaft, with two braking elements being associated with the rotor shaft and each braking element having a separate actuator operatively associated with the respective braking element.

5. The linear drive of claim 1, for use with an item of furniture.

6. linear drive of claim 1, wherein the actuator is a piezo actuator.

7. A linear drive, comprising:

a housing;

at least one drive motor disposed in the housing;

at least one moveable driven member operatively connected to the at least one drive motor;

at least one braking element arranged inside the housing and capable of braking the motor; and at least one actuating member connected to a respective braking element and implemented in the form of an actuator, with the actuator changing a shape in response to an applied electric voltage, wherein the at least one drive motor has a rotor shaft, with two braking elements being associated with the rotor shaft and one of a spring-loaded linkage and a lever disposed between the two braking elements.

8. The linear drive of claim 7, wherein the actuator is a piezo actuator.

9. A linear drive, comprising:

a housing;

at least one drive motor disposed in the housing;

at least one moveable driven member operatively connected to the at least one drive motor;

at least one braking element arranged inside the housing and capable of braking the motor; and at least one actuating member connected to a respective braking element and implemented in the form of an actuator, with the actuator changing a shape in response to an applied electric voltage, wherein the at least one drive motor includes an electric circuit and wherein an electric circuit of the actuator of the at least one actuating member is integrated with the electric circuit of the at least one drive motor and connected in parallel with the electric circuit of the at least one drive motor.

10. The linear drive of claim 9, wherein the actuator is a piezo actuator.

11. A linear drive, comprising:

a housing;

at least one drive motor disposed in the housing;

at least one moveable driven member operatively connected to the at least one drive motor;

at least one braking element arranged inside the housing and capable of braking the motor;

at least one actuating member connected to a respective braking element and implemented in the form of an actuator, with the actuator changing a shape in response to an applied electric voltage, and a relay connected in parallel with the at least one drive motor and having a relay contact, wherein the at least one drive motor includes an electric circuit and wherein an electric circuit of the actuator of the at least one actuating member is integrated with the electric circuit of the at least one drive motor and switched by the relay contact.

12. The linear drive of claim 11, wherein the electric circuit of the actuator further includes a plurality of diodes arranged in pairs and connected back-to-back, thereby forming a full-wave rectifier circuit having a rectified voltage output, with the actuator and the relay contact being connected in series to the rectified voltage output.

13. The linear drive of claim 11, wherein the actuator is a piezo actuator.

* * * * *